(12) United States Patent
Choi et al.

(10) Patent No.: US 10,901,452 B2
(45) Date of Patent: Jan. 26, 2021

(54) SYSTEM-ON-CHIP TO SUPPORT FULL HANDSHAKE AND MOBILE DEVICE HAVING THE SAME

(71) Applicant: Samsung Electronics Co., Ltd., Suwon-si (KR)

(72) Inventors: Youn-Sik Choi, Yongin-si (KR); Jin-Ook Song, Seoul (KR); Ho-Yeon Jeon, Hwaseong-si (KR); Jae-Gon Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/512,849

(22) Filed: Jul. 16, 2019

(65) Prior Publication Data

US 2019/0339732 A1   Nov. 7, 2019

Related U.S. Application Data

(63) Continuation of application No. 15/388,366, filed on Dec. 22, 2016, now Pat. No. 10,372,156, which is a
(Continued)

(30) Foreign Application Priority Data

Dec. 8, 2014  (KR) .......................... 10-2014-0175083

(51) Int. Cl.
*G06F 1/06* (2006.01)
*H04J 3/06* (2006.01)
(Continued)

(52) U.S. Cl.
CPC .................. *G06F 1/06* (2013.01); *G06F 1/04* (2013.01); *H04J 3/0685* (2013.01); *H04L 7/0008* (2013.01)

(58) Field of Classification Search
CPC ......... H04J 3/0685; H04L 7/0008; H06F 1/06
See application file for complete search history.

(56) References Cited

U.S. PATENT DOCUMENTS 6,173,408 B1   1/2001   Jimbo et al.
7,222,251 B2   5/2007   Ahmad et al.
(Continued)

FOREIGN PATENT DOCUMENTS

CN   1348558 A   5/2002
CN   1914581 A   2/2007
(Continued)

OTHER PUBLICATIONS

"Low Power Interface Specification ARM Q-Channel and P-Channel Interfaces," 2013, 1-44 pages, ARM Limited.

*Primary Examiner* — Sung S Ahn
(74) *Attorney, Agent, or Firm* — Harness, Dickey & Pierce, P.L.C.

(57) ABSTRACT

A system-on-chip (SoC) comprises a clock management unit (CMU) including a first clock generator and a second clock generator, the first and second clock generators being configured to generate clock signals. The SoC comprises at least one logic block configured to request the clock signals from the CMU according to a full handshake method and receive the clock signals from the CMU in response to the request. The first clock generator and the second clock generator are configured to communicate according to the full handshake method.

20 Claims, 11 Drawing Sheets

Related U.S. Application Data continuation of application No. 14/824,685, filed on Aug. 12, 2015, now Pat. No. 9,582,026.

(60) Provisional application No. 62/069,543, filed on Oct. 28, 2014, provisional application No. 62/057,388, filed on Sep. 30, 2014.

(51) Int. Cl.
*H04L 7/00* (2006.01)
*G06F 1/04* (2006.01)

(56) References Cited

U.S. PATENT DOCUMENTS

| | | |
|---|---|---|
| 8,595,541 B2 | 11/2013 | Rowland |
| 8,826,047 B1 | 9/2014 | Zhu et al. |
| 8,996,906 B1 | 3/2015 | Townley et al. |
| 9,582,026 B2 | 2/2017 | Choi et al. |
| 2009/0019303 A1 | 1/2009 | Rowland |
| 2011/0050300 A1 | 3/2011 | Klapproth et al. |
| 2011/0202788 A1 | 8/2011 | Hesse et al. |

FOREIGN PATENT DOCUMENTS

| | | |
|---|---|---|
| CN | 101876847 A | 11/2010 |
| CN | 102193580 A | 9/2011 |

SYSTEM-ON-CHIP TO SUPPORT FULL HANDSHAKE AND MOBILE DEVICE HAVING THE SAME

CROSS-REFERENCE TO RELATED APPLICATION

This application is a continuation of U.S. application Ser. No. 15/388,366, filed on Dec. 22, 2016, which is a continuation of U.S. application Ser. No. 14/824,685, filed on Aug. 12, 2015, and issued as U.S. Pat. No. 9,582,026 on Feb. 28, 2017, which claims the benefit of provisional U.S. application No. 62/057,388 filed on Sep. 30, 2014, along with provisional U.S. application No. 62/069,543 filed on Oct. 28, 2014, and also claims priority under 35 U.S.C. § 119 to Korean Patent Application No. 10-2014-0175083 filed on Dec. 8, 2014, the disclosure of each of which is hereby incorporated by reference in its entirety.

BACKGROUND

1. Field

At least one example embodiment of the inventive concepts relates to a system-on-chip (SoC), and more particularly, to an SoC which supports a full handshake method between a clock management unit and at least one intellectual property (IP) and/or a mobile device having the same.

2. Description of Related Art

Generally, an SoC includes a plurality of intellectual properties (IPs). Each of the plurality of IPs receives a clock signal from a clock management unit.

Generally, each of the plurality of IPs or IP cores may continually receive the clock signal while operating. The clock signal is continually provided even though the clock signal is not necessary for operating IPs or IP cores during a certain time periods. Here, in order to cut supply of a clock signal, user may preset the IP or IP core to cut supply of the clock signal.

SUMMARY

At least one example embodiment of the inventive concepts provides a system-on-chip (SoC) capable of receiving a clock signal when the clock signal is desired.

Other example embodiments of the inventive concepts provide a mobile device having the SoC.

Aspects of the inventive concepts should not be limited by the below description, and other unmentioned aspects will be clearly understood by one of ordinary skill in the art from example embodiments described herein.

According to at least one example embodiment, a system-on-chip (SoC) comprises a clock management unit (CMU) including a first clock generator and a second clock generator, the first and second clock generators being configured to generate clock signals. The SoC comprises at least one logic block configured to request the clock signals from the CMU according to a full handshake method and receive the clock signals from the CMU in response to the request. The first clock generator and the second clock generator are configured to communicate according to the full handshake method.

According to at least one example embodiment, the first clock generator is configured to generate a first clock signal as part of the clock signals, and the second clock generator is configured to generate a second clock signal as part of the clock signals. The at least one logic block is configured to request one of the first clock signal, the second clock signal, and a clock signal generated by combination of the first clock signal and the second clock signal.

According to at least one example embodiment, the first clock generator is configured to transmit the first clock signal to the second clock generator and the second clock generator is configured to generate the second clock signal using the first clock signal.

According to at least one example embodiment, if the second clock generator requests the first clock signal from the first clock generator, the first clock generator is configured to provide the first clock signal to the second clock generator.

According to at least one example embodiment, if the second clock generator does not request the first clock signal from the first clock generator and a clock request signal is deactivated, the first clock generator is configured to deactivate a clock response signal.

According to at least one example embodiment, the CMU further includes a manager configured to connect to the at least one logic block according to the full handshake method, wherein the first clock generator includes a first full handshake circuit, the second clock generator includes a second full handshake circuit, and the manager is configured to control the first full handshake circuit and the second full handshake circuit.

According to at least one example embodiment, the logic block includes an intellectual property (IP) core, and the IP core is configured to activate a clock request signal if the clock signal is desired.

According to at least one example embodiment, the CMU is configured to simultaneously activate a clock response signal in response to activation of the clock request signal and provide the requested clock signal to the IP core.

According to at least one example embodiment, the IP core is configured to deactivate the clock request signal if the requested clock signal is not desired.

According to at least one example embodiment, the CMU is configured to simultaneously deactivate the clock response signal in response to deactivation of the clock request signal and deactivate the clock signal.

According to at least one example embodiment, a mobile device including an application processor (AP) includes a clock management unit (CMU) including a first clock generator and a second clock generator, the first clock generator and the second clock generator being configured to generate clock signals. The AP includes at least one logic block configured to request the clock signals from the CMU according to a full handshake method and receive the clock signals from the CMU. Each of the first clock generator and the second clock generator are configured to communicate according to the full handshake method.

According to at least one example embodiment, the first clock generator is configured to generate a first clock, and the second clock generator is configured to generate a second clock. The clock signals include one of the first clock signal, the second clock signal, and a clock signal generated by combination of the first clock and the second clock.

According to at least one example embodiment, the first clock generator is configured to transmit the first clock signal to the second clock generator and the second clock generator is configured to generate the second clock signal using the first clock signal.

According to at least one example embodiment, wherein if the second clock generator requests the first clock signal from the first clock generator, the first clock generator is configured to provide the first clock signal to the second clock generator.

According to at least one example embodiment, if the second clock generator does not request the first clock signal from the first clock generator and a clock request signal is deactivated, the first clock generator is configured to deactivate a clock response signal.

According to at least one example embodiment, the CMU further includes a manager configured to connect to the logic block according to the full handshake method. The first clock generator includes a first full handshake circuit, the second clock generator includes a second full handshake circuit, and the manager is configured to control the first full handshake circuit and the second full handshake circuit.

According to at least one example embodiment, the logic block includes an IP core, and the IP core is configured to activate a clock request signal if one of the clock signals is desired.

According to at least one example embodiment, the CMU is configured to simultaneously activate a clock response signal in response to activation of the clock request signal and provide at least one of the clock signals to the IP core.

According to at least one example embodiment, the IP core is configured to deactivate the clock request signal if the clock signals are not desired.

According to at least one example embodiment, the CMU is configured to simultaneously deactivate the clock response signal in response to deactivation of the clock request signal and deactivate the clock signals.

According to at least one example embodiment, a method of driving an SoC includes requesting, by the at least one logic block, a clock signal from the CMU according to a full handshake method. The method includes transmitting, by the CMU, the clock signal to the at least one logic block if the CMU accepts the request. The method includes performing a communication between the first clock generator and the second clock generator according to the full handshake method.

According to at least one example embodiment, the requesting includes activating, by the at least one logic block, a clock request signal if the clock signal is desired.

According to at least one example embodiment, the transmitting comprises activating, by the CMU, a clock response signal in response to activation of the clock request signal. The transmitting includes providing, by the CMU, the clock signal to the at least one logic block.

According to at least one example embodiment, the method includes deactivating, by the at least one logic block, the clock request signal if the clock signal is not desired.

According to at least one example embodiment, the method includes deactivating, by the CMU, the clock response signal in response to deactivation of the request signal, and deactivating, by the CMU, the clock signal.

According to at least one example embodiment, the method includes generating, by the first clock generator, a first clock signal, and generating, by the second clock generator, a second clock signal. The clock signal includes one of the first clock signal, the second clock signal, and a clock signal generated by combination of the first clock signal and the second clock signal.

According to at least one example embodiment, the method includes transmitting, by the first clock generator, the first clock signal to the second clock generator, and generating, by the second clock generator, the second clock signal using the first clock signal.

According to at least one example embodiment, the method includes providing, by the first clock generator, the first clock signal to the second clock generator if the second clock generator request the first clock signal from the first clock generator.

According to at least one example embodiment, the method includes deactivating, by the first clock generator, a clock response signal according to a clock request signal if the second clock generator does not request the first clock signal from the first clock generator and the clock request signal is deactivated.

According to at least one example embodiment, a device, includes a clock signal manager configured to manage at least one logic block by receiving, from the at least one logic block, a first request signal indicating a request for a first clock signal, and simultaneously sending a first acknowledgement signal and the first clock signal to the at least one logic block in response to the first request signal.

According to at least one example embodiment, the first acknowledgement signal and the first clock signal remain activated until the first request signal is deactivated by the at least one logic block.

According to at least one example embodiment, at least one clock signal is a first clock signal and a second clock signal, different from the first clock signal, and the clock signal manager includes a multiplexer configured to receive the first clock signal and the second clock signal, and transition from outputting the first clock signal to outputting the second clock signal based on a selection signal.

According to at least one example embodiment, if the selection signal indicates the transition, the clock signal manager is configured to, receive, from the at least one logic block, a second request signal indicating a request for the second clock signal, and simultaneously send a second acknowledgement signal and the second clock signal to the at least one logic block.

According to at least one example embodiment, a duration of the second acknowledgement signal overlaps a duration of the first acknowledgement signal.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EXAMPLE EMBODIMENTS

Figure 1:
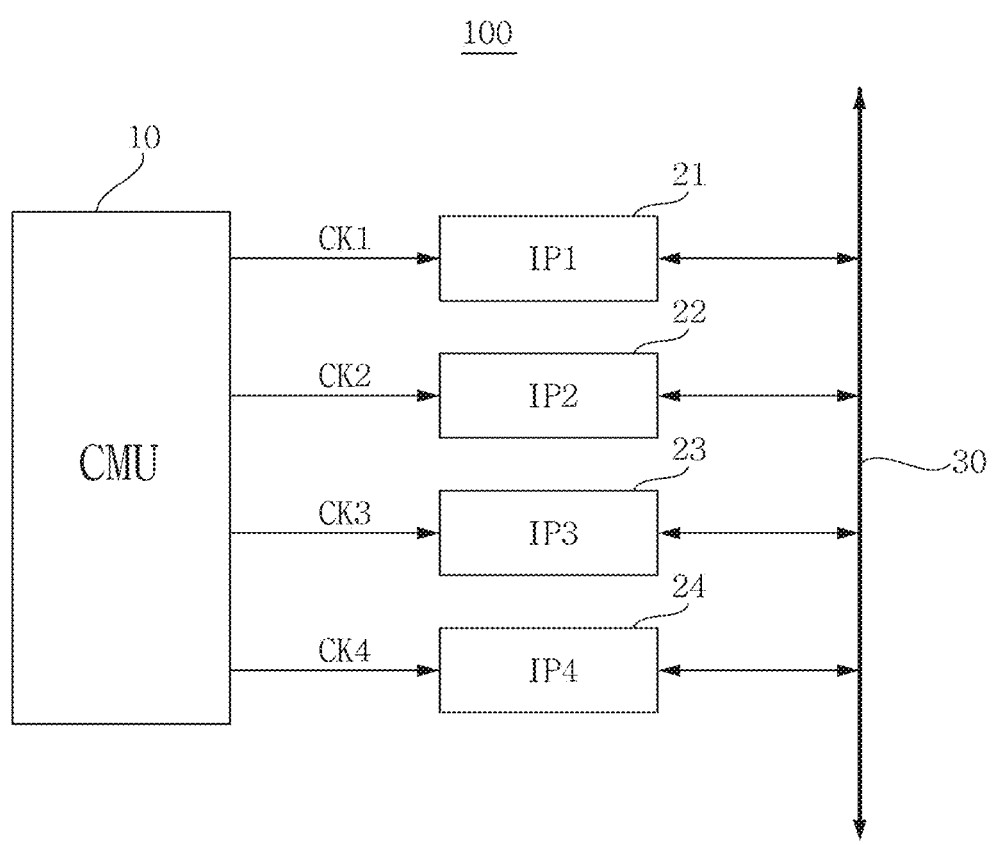
FIG. 1 is a block diagram illustrating a system-on-chip (SoC) according to at least one example embodiment of the inventive concepts.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASIC s), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

FIG. 1 is a block diagram illustrating a system-on-chip (SoC) according to at least one example embodiment of the inventive concepts.

Referring to FIG. 1, the SoC 100 according to at least one example embodiment of the inventive concepts may include at least one clock management unit and a logic block. For example, the logic block may be implemented with at least one intellectual property (IP) or IP core.

For example, the SoC 100 may include a clock management unit (CMU) 10 (also referred to as a clock signal manager or a clock management device) and first to fourth IPs or IP cores 21 to 24. The IPs or IP cores may be a reusable logic device, cell, or chip layout design that is the intellectual property of one party (or entity). The IPs or IP cores may be licensed to other parties or owned and used by a single party. The IPs or IP cores may serve as building blocks within an ASIC chip or FPGA logic design.

The CMU 10 may generate a clock (or clock signal) which is supplied to each of the first to fourth IPs 21 to 24. For example, the CMU 10 may generate first to fourth clocks (or clock signals) CK1 to CK4.

Each of the first to fourth IPs 21 to 24 may be connected to a system bus 30 and communicate with each other through the system bus 30. In at least one example embodiment of the inventive concepts, each of the first to fourth IPs 21 to 24 may include a processor, a graphic processor, a memory controller, an input and output interface block, etc.

For example, the CMU 10 may supply the first clock CK1 to the first IP 21. The CMU 10 may supply the second clock CK2 to the second IP 22. The CMU 10 may supply the third clock CK3 to the third IP 23. Finally, the CMU 10 may supply the fourth clock CK4 to the fourth IP 24.

Any one of the first to fourth IPs 21 to 24 may transmit a clock request signal to the CMU 10 according to a full handshake method.

For example, the first IP 21 may transmit a clock request signal to the CMU 10 according to the full handshake method. The CMU 10 may receive the clock request signal and transmit a response signal to the first IP 21. Further, the CMU 10 may transmit a clock to the first IP 21 at the same time.

In view of the above, the full handshake method should be understood to include requesting a clock signal, acknowledging the request, and sending the clock signal. The full handshake method may also include requesting not to receive a clock signal, acknowledging the request, and terminating the clock signal.

In at least one example embodiment of the inventive concepts, the full handshake method may include Q-channel interface specifications or P-channel interface specifications of ARM™. The full handshake method may be described in FIG. 2 in detail.

Figure 2:
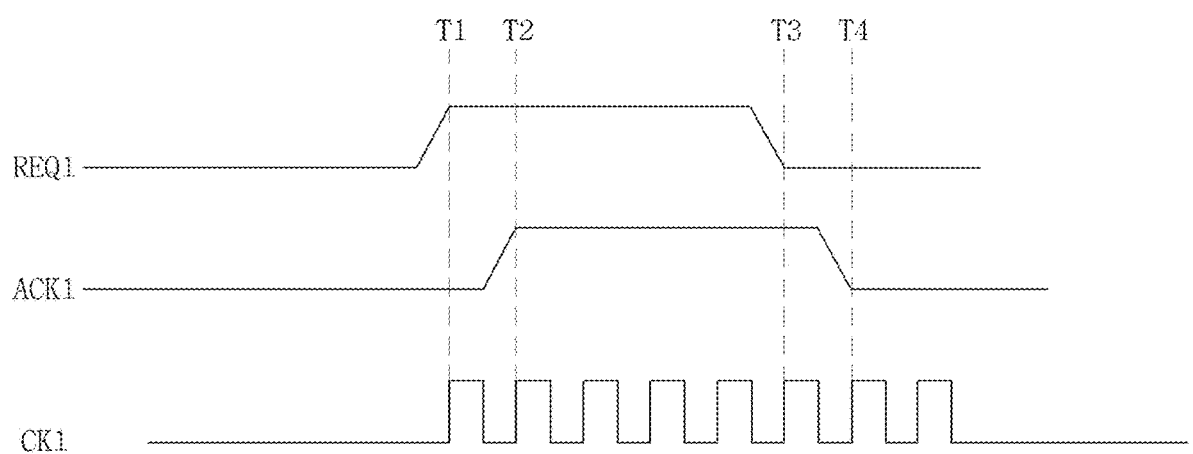
FIG. 2 is a timing diagram according to a full handshake method.

FIG. 2 is a timing diagram according to the full handshake method.

Referring to FIGS. 1 and 2, at time T1, when the first IP 21 needs a first clock CK1, the first IP 21 activates a first clock request signal REQ1. For example, the first IP 21 makes the first clock request signal REQ1 to a high state.

In response to activation of the first clock request signal REQ1, the CMU 10 activates a first response signal ACK1 with respect to the first clock request signal REQ1 at time T2. That is, the CMU 10 transitions the first response signal ACK1 to a high state.

The CMU 10 may transmit the first clock CK1 to the first IP 21 at time T1, prior to activation of the first response signal ACK1. Further, The CMU 10 may transmit the first clock CK1 to the first IP 21 at time T2, in sync with the first response signal ACK1.

At time T3, when the first IP 21 does not desire the first clock CK1, the first IP 21 deactivates the first clock request signal REQ1. That is, the first IP 21 transitions the first clock request signal REQ1 to a low state.

When the first clock request signal REQ1 is in a low state, the CMU 10 transitions the first response signal ACK1 to a low state at time T4 and deactivates the first response signal ACK1 at the same time.

When the first response signal ACK1 is activated, the first IP 21 may be normally operated.

Figure 3:
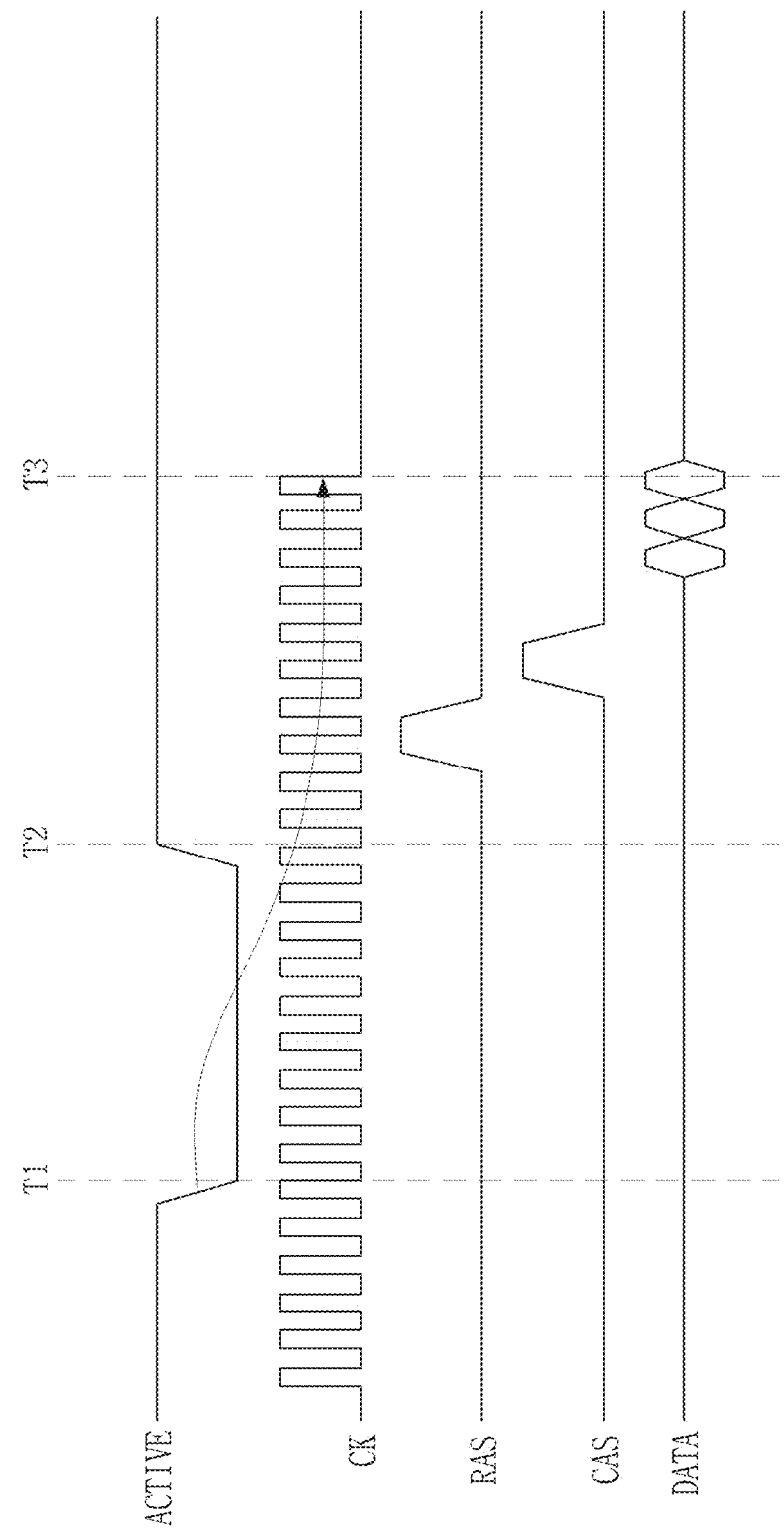
FIG. 3 is a timing diagram for describing a problem of the related art.

FIG. 3 is a timing diagram for describing a problem of the related art.

Referring to FIGS. 1 and 3, when the CMU 10 and the first IP 21 do not use a handshaking signal, a problem may occur. That is, to access a DRAM, the first IP 21 informs the CMU 10 of a status of the first IP 21 through an ACTIVE signal. The CMU 10 receives the ACTIVE signal and activates or deactivates a clock signal (CK). Here, the CMU 10 needs latency for a logic block.

In T1 time, when the first IP 21 transits the ACTIVE signal to a low state, the CMU 10 gates the clock signal CK in T3 time. That is, the CMU 10 deactivates the clock signal CK in T3 time. However, in T2 time, when the first IP 21 transits the ACTIVE signal to a high state, the DRAM may operate in synchronization with the clock signal. Accordingly, a protocol of the DRAM may be violated.

For example, a dynamic random access memory (DRAM) is used for describing a problem of the related art.

A row address strobe (RAS) signal may provide a read or write timing with respect to a row address in a read operaton or a write operation of the DRAM. When the RAS signal is activated, the DRAM may perceive a row address received from an address port of the DRAM.

Likewise, a column address strobe (CAS) signal may provide a read or write timing with respect to a column address in a read operation or a write operation of the DRAM. When the CAS signal is activated, the DRAM may perceive a column address received from an address port of the DRAM.

From T1 time to T2 time, when the ACTIVE signal is in low state, the DRAM may be normally operated. However, from T2 time to T3 time, when the ACTIVE signal is in high state, the DRAM may receive the clock signal CK, the RAS signal, and the CAS signal. The DRAM may perform the read operation or the write operation in synchronization with the clock signal CK. Here, because the ACTIVE signal is in high state, the operation of the DRAM violates a protocol of DRAM.

To solve this problem, the CMU according to at least one example embodiment of the inventive concepts may transmit a clock signal to an IP according to the full handshake method. Accordingly, a problem in that supply of a clock signal is blocked does not occur while operating.

Figure 4:
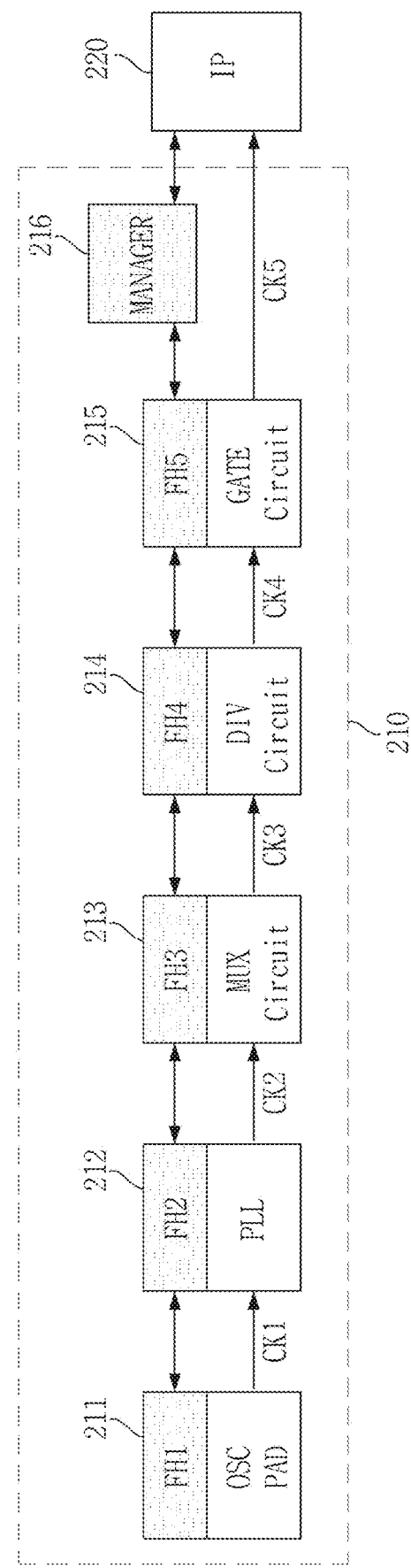
FIG. 4 is a block diagram illustrating an SoC according to at least one example embodiment of the inventive concepts.

FIG. 4 is a block diagram illustrating an SoC according to at least one example embodiment of the inventive concepts.

Referring to FIG. 4, the SoC 200 according to at least one example embodiment of the inventive concepts includes a CMU 210 and at least one IP 220. The SoC 200 includes one IP 220 for convenience of a description. However, the inventive concepts are not limited thereto.

The CMU 210 according to an embodiment of the inventive concept may include a characteristic of a general clock controller. The CMU 210 may include an oscillator (OSC) PAD 211, a phase locked loop (PLL) 212, a multiplexor (MUX) circuit 213, a divider (DIV) circuit 214, a gate circuit 215, and a manager 216.

The OSC PAD 211 receives an external clock signal from an oscillator outside the CMU 210. The OSC PAD 211 ouputs the external clock signal as a first clock CK1.

The PLL 212 may receive the first clock CK1 and uniformly keep a phase of the first clock CK1. Accordingly, the PLL 212 generates a second clock CK2.

The MUX circuit 213 may receive a plurality of clock signals. When the MUX circuit 213 receives a plurality of clock signals, the MUX circuit 213 may output one of the plurality of clock signals. However, the MUX circuit 213 only receives the second clock CK2, the MUX circuit 213 may generate a third clock CK3 which is equal to the second clock CK2.

The DIV circuit 214 receives the third clock CK3. The DIV circuit 214 may divide the third clock CK3. For example, the DIV circuit 214 may divide the third clock CK3 by two and generate a fourth clock CK4 having a twice slower frequency than that of the third clock CK3.

The gate circuit 215 receives the fourth clock CK4. The gate circuit 215 may gate the fourth clock CK4 and a clock control signal and generate a fifth clock CK5. For example, when the clock control signal is deactivated, the gate circuit 215 may deactivate the fifth clock CK5.

Each of the OSC PAD 211, the PLL 212, the MUX circuit 213, the DIV circuit 214, and the gate circuit 215 may include a clock generator.

The OSC PAD 211 may include a first full handshake circuit FH1. The PLL 212 may include a second full handshake circuit FH2. The MUX circuit 213 may include a third full handshake circuit FH3. The DIV circuit 214 may include a fourth full handshake circuit FH4. The gate circuit 215 may include a fifth full handshake circuit FH5.

Each of the first to fifth full handshake circuits FH1 to FH5 may communicate according to the full handshake method. For example, each of the first and second full handshake circuits FH1 and FH2 may support the full handshake method between the OSC PAD 211 and the PLL 212.

Each of the second and third full handshake circuits FH2 and FH3 may support the full handshake method between the PLL 212 and the MUX circuit 213.

Each of the third and fourth full handshake circuits FH3 and FH4 may support the full handshake method between the MUX circuit 213 and the DIV circuit 214.

Each of the fourth and fifth full handshake circuits FH4 and FH5 may support the full handshake method between the DIV circuit 214 and the gate circuit 215.

Likewise, each of the fifth full handshake circuit FH5 and the manager 216 may support the full handshake method between the gate circuit 215 and the manager 216.

The IP 220 may request a clock to the CMU 210 according to the full handshake method. For example, only when the clock is desired, the IP 220 may activate a request signal. That is, the IP220 may transmit the activated request signal to the CMU 210 when the clock is desired.

The manager 216 may receive the activated request signal. The manager 216 transmits the activated request signal to the gate circuit 215. The gate circuit 215 transmits the activated request signal to the DIV circuit 214. The DIV circuit 214 transmits the activated request signal to the MUX circuit 213. The MUX circuit 213 transmits the activated request signal to the PLL 212. Finally, PLL 212 transmits the activated request signal to the OSC PAD 211.

In at least one example embodiment of the inventive concepts, each of the OSC PAD 211, the PLL 212, the MUX circuit 213, the DIV circuit 214, the gate circuit 215, and the manager 216 may be implemented with a combinational circuit. Accordingly, the activated request signal may be transmitted from the manager 216 to the OSC PAD 211 at once.

The OSC PAD 211 may generate a first clock CK1. The PLL 212 may generate a second clock CK2. The MUX circuit 213 may generate a third clock CK3. The DIV circuit 214 may generate a fourth clock CK4. The gate circuit 215 may generate a fifth clock CK5.

The OSC PAD 211 activates a response signal with respect to the activated request signal. That is, OSC PAD 211 transmits the response signal with respect to the activated request signal to the PLL 212. At the same time, the OSC PAD 211 transmits the first clock CK1 to the PLL 212.

The PLL 212 transmits the activated response signal to the MUX circuit 213. At the same time, the PLL 212 transmits the second clock CK2 to the MUX circuit 213.

The MUX circuit 213 transmits the activated response signal to the DIV circuit 214. At the same time, the MUX circuit 213 transmits the third clock CK3 to the DIV circuit 214.

The DIV circuit 214 transmits the activated response signal to the gate circuit 215. At the same time, the DIV circuit 214 transmits the fourth clock CK4 to the gate circuit 215.

The gate circuit 215 transmits the activated response signal to the manager 216. At the same time, the gate circuit 215 transmits the fifth clock CK5 to the IP 220. The manager 216 transmits the activated response signal to the IP 220.

Further, the IP 220 may receive one of the first to fifth clocks CK1 to CK5.

Likewise, the activated response signal may be transmitted from the OSC PAD 211 to the manager 216 at once.

When a clock is not desired, the IP 220 may deactivate the request signal. That is, when a clock is not desired, the IP 220 may transmit the deactivated request signal to the CMU 210.

The manager 216 receives the deactivated request signal. The manager 216 transmits the deactivated request signal to gate circuit 215. The gate circuit 215 transmits the deactivated request signal to the DIV circuit 214. The DIV circuit 214 transmits the deactivated request signal to the MUX circuit 213. The MUX circuit 213 transmits the deactivated request signal to the PLL 212. Finally, the PLL 212 transmits the deactivated request signal to the OSC PAD 211.

Each of the first to fifth full handshake circuits FH1 to FH5 and the manager 216 may be implemented with a combinational circuit. Accordingly, the deactivated request signal may be transmitted from the manager 215 to the OSC PAD 211 at once.

The OSC PAD 211 deactivated a response signal with respect to the deactivated request signal. That is, the OSC PAD 211 transmits the deactivated response signal to the PLL 212. At the same time, the OSC PAD 211 deactivated the first clock CK1.

The PLL 212 transmits the deactivated response signal to the MUX circuit 213. At the same time, the PLL 212 deactivated the second clock CK2.

The MUX circuit 213 transmits the deactivated response signal to the DIV circuit 214. At the same time, the MUX circuit 213 deactivated the third clock CK3.

The DIV circuit 214 transmits the deactivated response signal to the gate circuit 215. At the same time, the DIV circuit 214 deactivated the fourth clock CK4.

The gate circuit 215 transmits the deactivated response signal to the manager 216. At the same time, the gate circuit 215 deactivated the fifth clock CK5. The manager 216 transmits deactivated response signal to the IP 220.

Likewise, the deactivated response signal may be transmitted from the OSC PAD 211 to the manager 216 at once.

Figure 5:
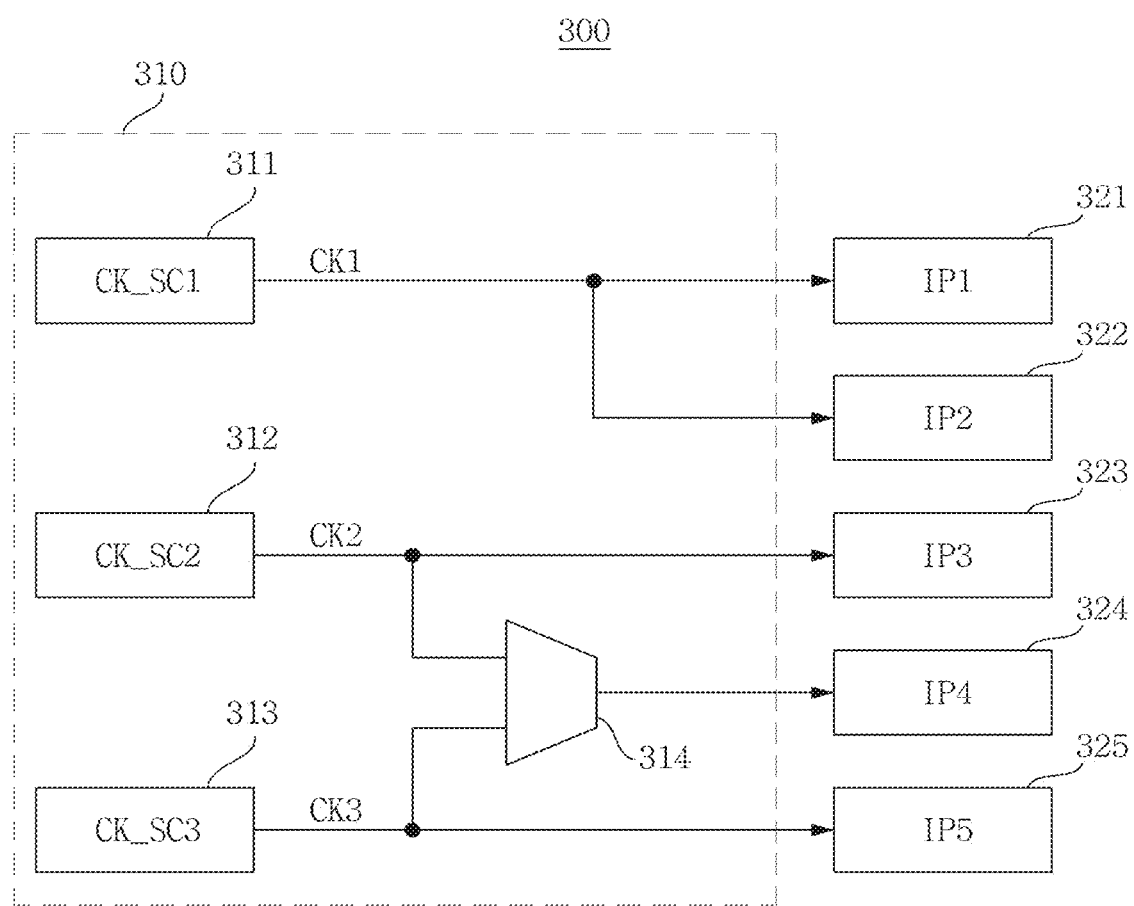
FIG. 5 is a block diagram illustrating an SoC according to at least one example embodiment of the inventive concepts.

FIG. 5 is a block diagram illustrating an SoC according to at least one example embodiment of the inventive concepts.

Referring to FIG. 5, the SoC 300 according to at least one example embodiment of the inventive concepts may include a CMU 310, a first IP (IP1) 321, a second IP (IP2) 322, a third IP (IP3) 323, a fourth IP (IP4) 324, and a fifth IP (IP5) 325.

The CMU 210 may include a first clock source (CK_SC1) 311, a second clock source (CK_SC2) 312, and a third clock source (CK_SC3) 313. For example, the CK_SC1 311 may generate a first clock CK1. The CK_SC2 312 may generate a second clock CK2. The CK_SC3 313 may generate a third clock CK3.

The CK_SC1 311 may provide the first clock CK1 to the IP1 321 and the IP2 322. The CK_SC2 312 may provide the second clock CK2 to the IP3 323. The CK_SC3 313 may provide the third clock CK3 to the IP5 325.

The CMU 210 may further include a multiplexor 314 for outputting one of the second clock CK2 and the third clock CK3. The multiplexor 314 may provide one of the second clock CK2 and the third clock CK3 to the fourth IP 324.

Figure 6:
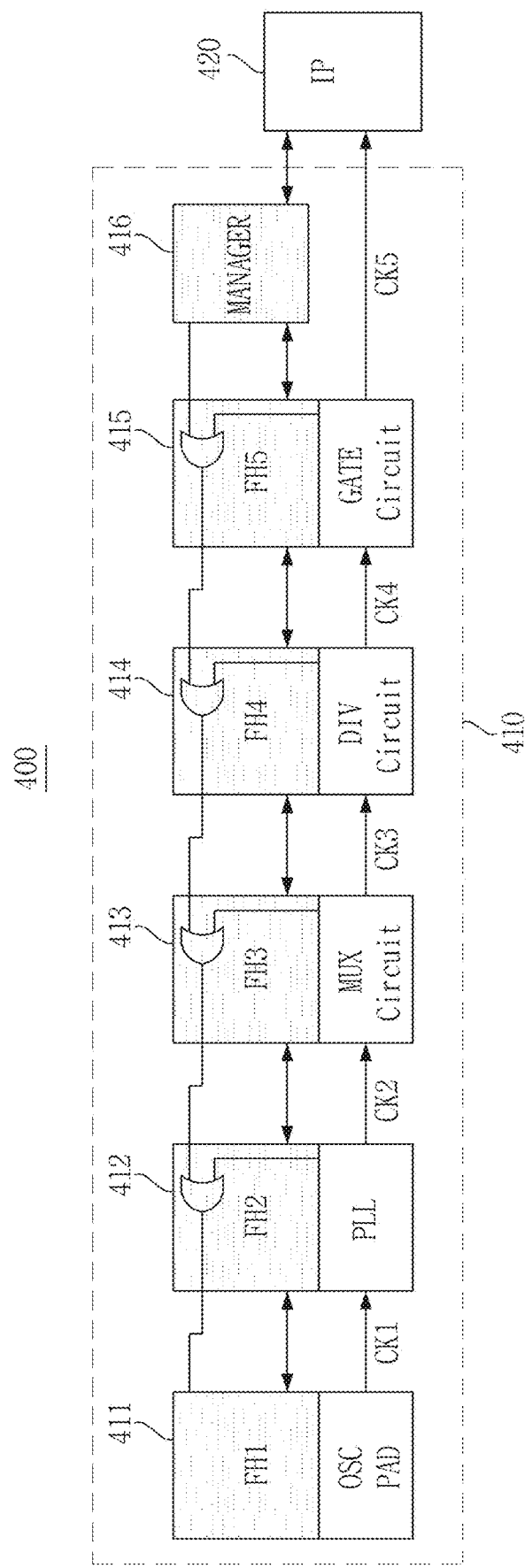
FIG. 6 is a block diagram illustrating an SoC according to at least one example embodiment of the inventive concepts.

FIG. 6 is a block diagram illustrating an SoC according to at least one example embodiment of the inventive concepts.

Referring to FIG. 6, the SoC 400 according to sat least one example embodiment of the inventive concepts includes a CMU 410 and at least one IP 420. The SoC 400 includes one IP 420 for convenience of a description. However, the inventive concepts are not limited thereto.

The CMU 410 according to an embodiment of the inventive concept may include a characteristic of a general clock controller. The CMU 410 may include an OSC PAD 411, a PLL 412, a MUX circuit 413, a DIV circuit 414, a gate circuit 415, and a manager 416.

Each of the OSC PAD 411, the PLL 412, the MUX circuit 413, the DIV circuit 414, and the gate circuit 415 may include a clock generator.

The OSC PAD 411 may include a first full handshake circuit FH1. The PLL 412 may include a second full handshake circuit FH2. The MUX circuit 413 may include a third full handshake circuit FH3. The DIV circuit 414 may include a fourth full handshake circuit FH4. The gate circuit 415 may include a fifth full handshake circuit FH5.

Each of the first to fifth full handshake circuits FH1 to FH5 may communicate according to the full handshake method.

When the IP 420 requests a clock during a clock off sequence, the manager 416 may transmit a command for blocking the clock off sequence to each of the first to fifth full handshake circuits FH1 to FH5.

For example, each of the second to fifth full handshake circuits FH2 to FH5 may include an OR gate.

The manager 416 may transmit a command signal for blocking the clock off sequence to an OR gate in the fifth full handshake circuit FH5.

The fifth full handshake circuit FH5 blocks the clock off sequence. The fifth full handshake circuit FH5 may transmit a command signal for blocking the clock off sequence to an OR gate in the fourth full handshake circuit FH4.

Further, the fifth full handshake circuit FH5 may transmit another command signal through an OR gate to the fourth full handshake circuit FH4.

The fourth full handshake circuit FH4 blocks the clock off sequence. The fourth full handshake circuit FH4 may transmit a command signal for blocking the clock off sequence to an OR gate in the third full handshake circuit FH3.

Further, the fourth full handshake circuit FH4 may transmit still another command signal through an OR gate to the third full handshake circuit FH3.

The third full handshake circuit FH3 blocks the clock off sequence. The third full handshake circuit FH3 may transmit a command signal for blocking the clock off sequence to an OR gate in the second full handshake circuit FH2.

Further, the third full handshake circuit FH3 may transmit yet another command signal through an OR gate to the second full handshake circuit FH2.

The second full handshake circuit FH2 blocks the clock off sequence. The second full handshake circuit FH2 may transmit a command signal for blocking the clock off sequence to an OR gate in the first full handshake circuit FH1.

Further, the second full handshake circuit FH2 may transmit yet another command signal through an OR gate to the first full handshake circuit FH1.

The first full handshake circuit FH1 blocks the clock off sequence.

Figure 7:
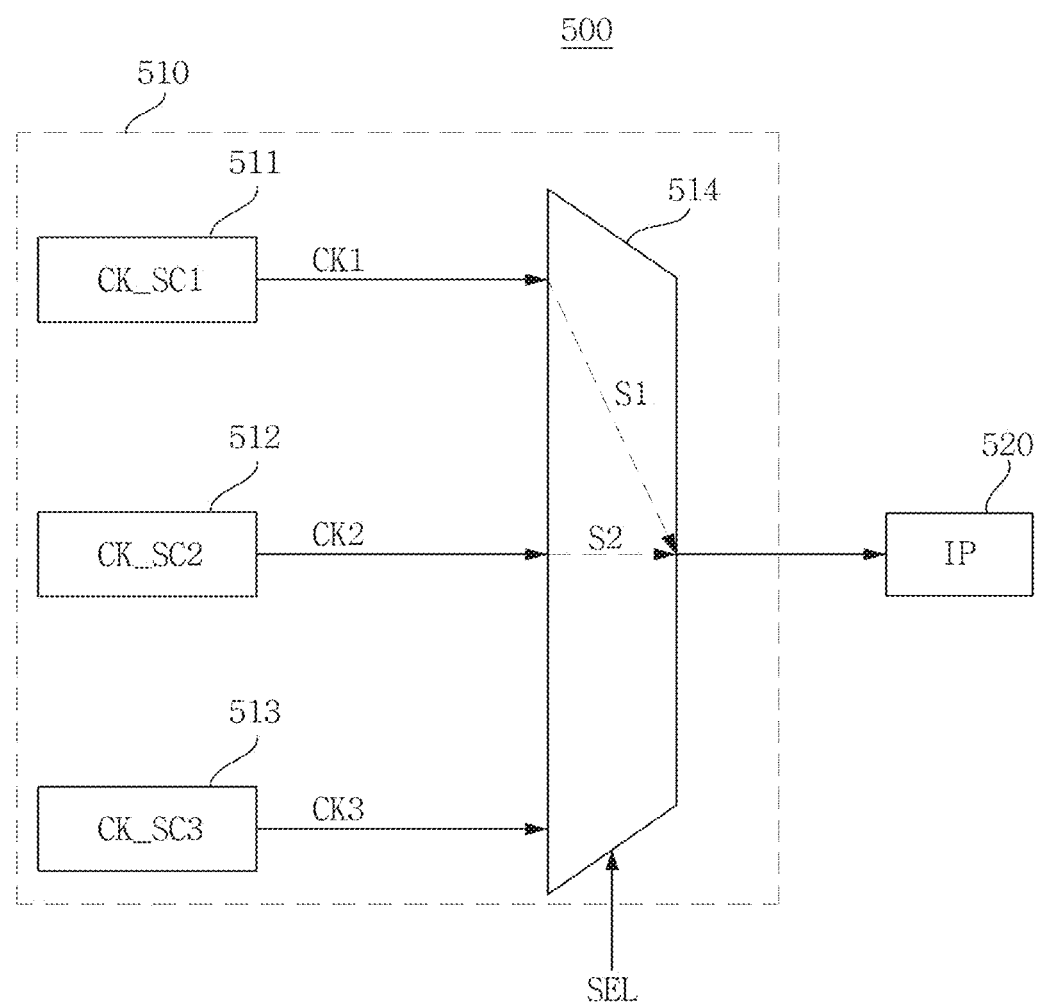
FIG. 7 is a block diagram illustrating an SoC according to at least one example embodiment of the inventive concepts.

FIG. 7 is a block diagram illustrating an SoC according to at least one example embodiment of the inventive concepts.

Referring to FIG. 7, the SoC 500 according to at least one example embodiment of the inventive concepts may include a CMU 510 and at least one IP 520.

The CMU 510 may include a first clock source (CK_SC1) 511, a second clock source (CK_SC2) 512, a third clock source (CK_SC3) 513, and a multiplexor 514. The CMU 510 may provide a clock multiplexor 514 without glitch. A method of outputting a clock without glitch using the SoC 500 is described in FIG. 8 in detail.

The CK_SC1 511 generates a first clock CK1. The CK_SC1 511 transmits the first clock CK1 to the multiplexor 514.

The CK_SC2 512 generates a second clock CK2. The CK_SC2 512 transmits the second clock CK2 to the multiplexor 514.

The CK_SC3 513 generates a third clock CK3. The CK_SC3 513 transmits the third clock CK3 to the multiplexor 514.

In response to a selection signal SEL, the multiplexor 514 outputs one of the first clock CK1, the second clock CK2, and the third clock CK3. The multiplexor 514 transmits the selected clock to the IP 520.

For example, the multiplexor 514 may transmit the first clock CK1 to the IP 520 (S1). Further, the multiplexor 514 may transmit the second clock CK2 to the IP 520 (S2).

Figure 8:
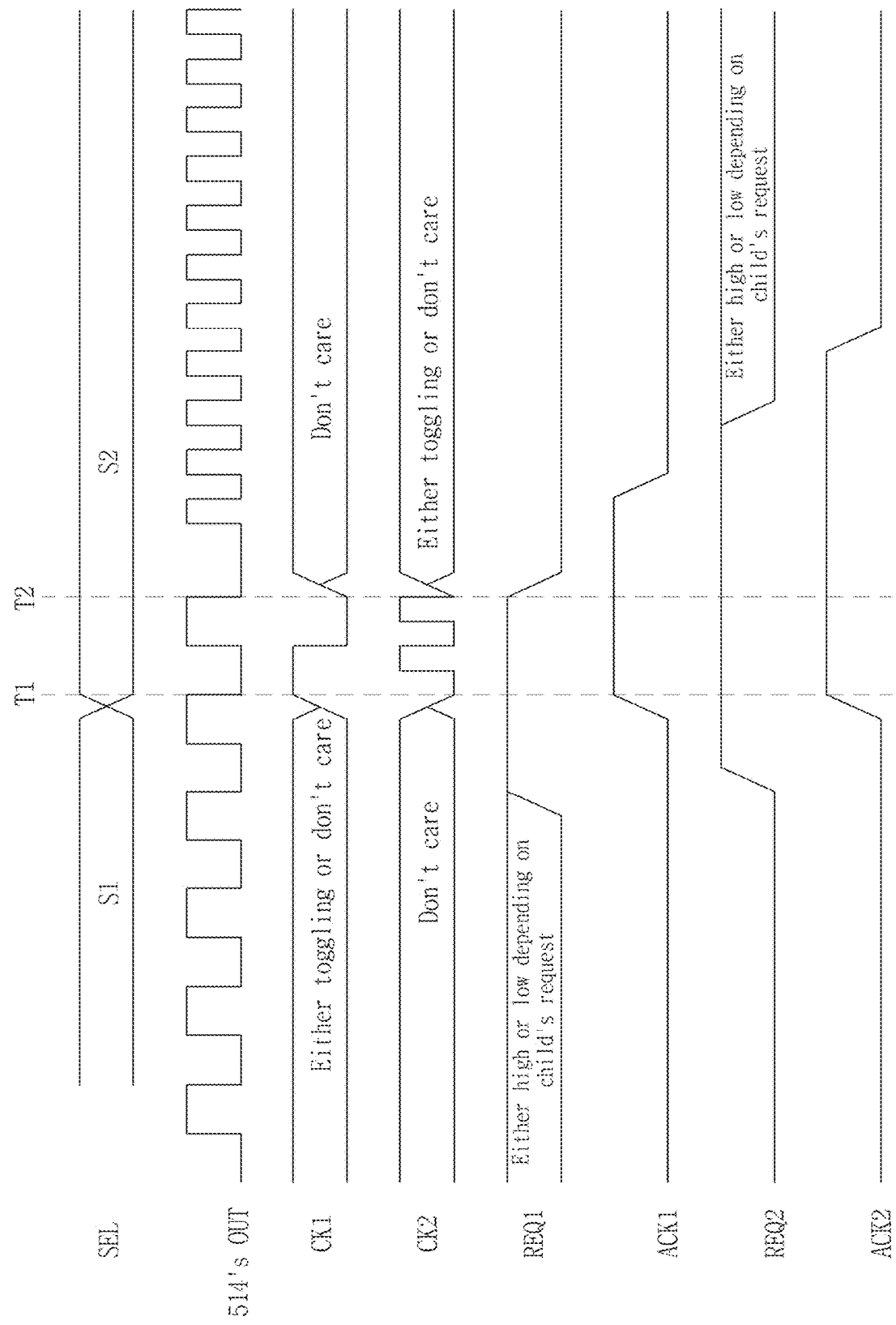
FIG. 8 is a timing diagram illustrating an operation of the SoC shown in FIG. 7.

FIG. 8 is a timing diagram illustrating an operation of the SoC shown in FIG. 7.

Referring to FIGS. 7 and 8, the SoC 500 may include a CMU 510 and an IP 520.

For example, when a selection signal SEL is changed at time T1, a clock transformed by the multiplexor 514 may output at time T2. Accordingly, from time T1 to time T2, all of the first clock CK1 and the second clock CK2 should be activated.

Prior to time T1, the IP 520 activates the first clock request signal REQ1. In response to activation of the clock request signal REQ1, the clock source 511 activates the first clock response signal ACK1. Accordingly, the IP 520 may receive the first clock CK1 through the multiplexor 514 (S1).

From time T1 to time T2, an output of the multiplexor 514 is transitioned from the first clock CK1 to the second clock CK2. When transitioning from the first clock CK1 to the second clock CK2, a glitch phenomenon may occur.

To generate a multiplexor clock MUX_CK without a glitch, the first clock source (CK_SC1) 511 generates the first clock CK1 and the second clock source (CK_SC2) 512 generates the second clock CK2 when the first clock CK1 is changed to the second clock CK2 (S2).

From time T1 to time T2, the first clock request signal REQ1 and the second clock request signal REQ2 are activated. That is, the first clock request signal REQ1 and the second clock request signal REQ2 have a high state.

Further, the first clock response signal ACK1 and the second clock response signal ACK2 are activated. That is, the first clock response signal ACK1 and the second clock response signal ACK2 have a high state.

At time T2, the IP 520 receives the second clock CK2 through the multiplexor 514 (S2).

After time T2, the first clock response signal ACK1 may be deactivated. That is, the first clock response signal ACK1 may have a low state. Accordingly, the first clock CK1 may be deactivated.

Figure 9:
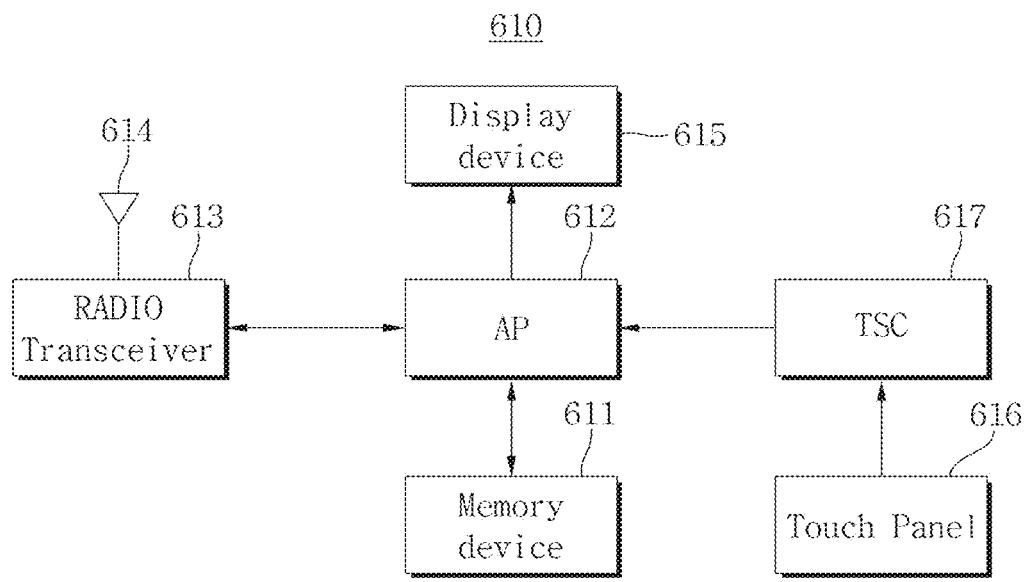
FIG. 9 is a block diagram illustrating at least one example embodiment of a computer system 610 including the SoC shown in FIG. 1.

FIG. 9 is a block diagram illustrating at least one example embodiment of a computer system 610 including the SoC shown in FIG. 1.

Referring to FIG. 9, the computer system 610 includes a memory device 611, an application processor (AP) 612 including a memory controller for controlling the memory device 611, a radio transceiver 613, an antenna 614, a display device 615, a touch pad 616, and a touch sensing controller (TSC) 617.

The radio transceiver 613 transmits and receives a radio signal through the antenna 614. For example, the radio transceiver 613 converts the radio signal received through the antenna 614 into a signal to be processed in the AP 612.

Accordingly, the AP 612 processes a signal outputted from the radio transceiver 613, and transmits the processed signal to the display device 616. Further, the radio transceiver 613 converts the signal outputted from the AP 612 into the radio signal, and transmits the converted radio signal to an external device through the antenna 614.

The touch pad 616 may receive a touch signal from a user. The touch pad 616 converts the touch signal into the amount of change of capacitance. The touch pad 616 transmits information about the amount of change of capacitance to the TSC 617. The TSC 617 converts the information about the amount of change of capacitance into coordinate information. The TSC 617 transmits the coordinate information to the AP 612.

In at least one example embodiment of the inventive concepts, the AP 612 may include the SoC 100 shown in FIG. 1.

Figure 10:
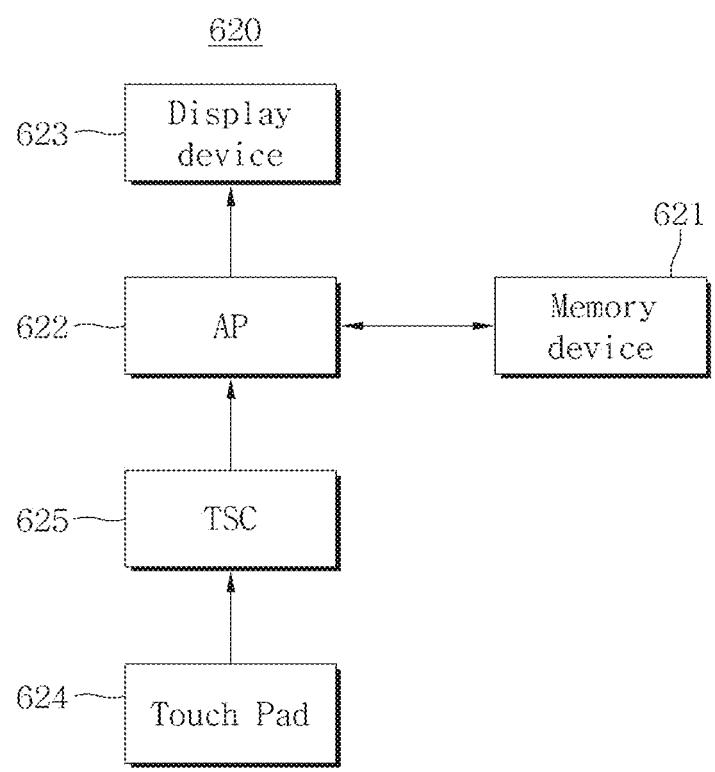
FIG. 10 is a block diagram illustrating at least one example embodiment of a computer system 620 including the SoC shown in FIG. 1.

FIG. 10 is a block diagram illustrating another example embodiment of a computer system 620 including the SoC shown in FIG. 1.

Referring to FIG. 10, the computer system 620 may be implemented as a personal computer (PC), a network server, a tablet PC, a netbook, an e-reader, a personal digital assistant (PDA), a portable multimedia player (PMP), an MP3 player, or an MP4 player.

The computer system 620 includes a memory device 621, an AP 622 including a memory controller for controlling a data processing operation of the memory device 621, a display device 623, a touch pad 624, and a TSC 625.

The touch pad 624 may receive a touch signal from a user. The touch pad 624 converts the touch signal into the amount of change of capacitance. The touch pad 624 transmits information about the amount of change of capacitance to the TSC 625. The TSC 625 converts the information about the amount of change of capacitance into coordinate information. The TSC 625 transmits the coordinate information to the AP 622.

The AP 622 displays data stored in the memory device 621 through the display device 623 according to data inputted through the touch pad 624.

In at least one example embodiment of the inventive concepts, the AP 622 may include the SoC 100 shown in FIG. 1.

Figure 11:
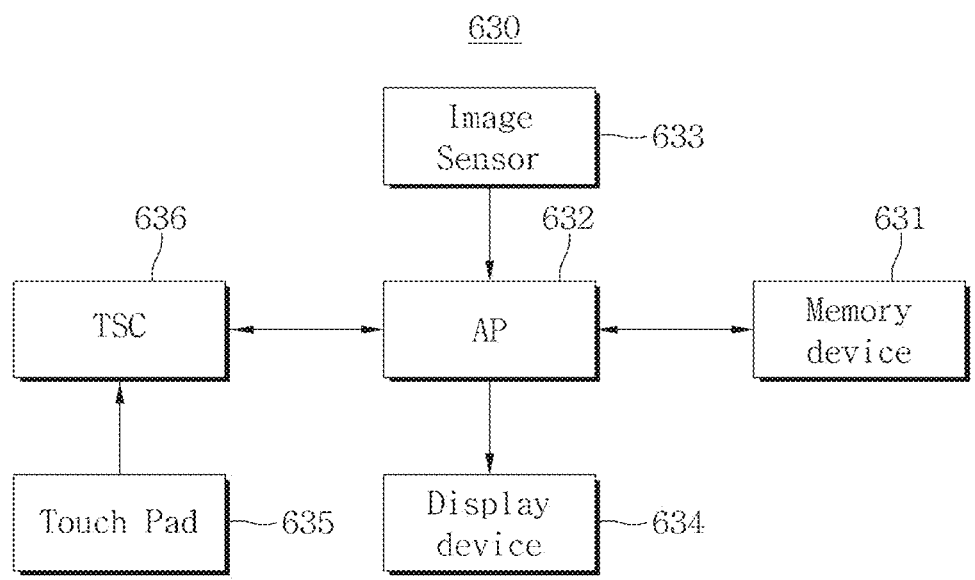
FIG. 11 is a block diagram illustrating at least one example embodiment of a computer system 630 including a touch sensing controller (TSC) shown in FIG. 1.

FIG. 11 is a block diagram illustrating still another example embodiment of a computer system 630 including the TSC shown in FIG. 1.

Referring to FIG. 11, the computer system 630 may be an image processing device, for example, a digital camera or a mobile phone on which the digital camera are installed, a smart phone, or a tablet PC.

The computer system 630 includes a memory device 631, an AP 632 including a memory controller for controlling a data processing operation of the memory device 631, for example, a write operation or a read operation, an image sensor 633, a display device 634, a touch pad 635, and a TSC 636.

The image sensor 633 converts an optical image into digital signals, and the converted digital signals are transmitted to the AP 632. According to control of the AP 632, the converted digital signals are displayed through the display device 634, or stored in the memory device 631.

Further, the data stored in the memory device 631 is displayed through the display device 634 according to the control of the AP 632.

The touch pad 635 may receive a touch signal from a user. The touch pad 635 converts the touch signal into the amount of change of capacitance. The touch pad 635 transmits information about the amount of change of capacitance to the TSC 636. The TSC 636 converts the information about the amount of change of capacitance into coordinate information. The TSC 636 transmits the coordinate information to the AP 632.

In at least one example embodiment of the inventive concepts, the AP 632 may include the SoC 100 shown in FIG. 1.

Figure 12:
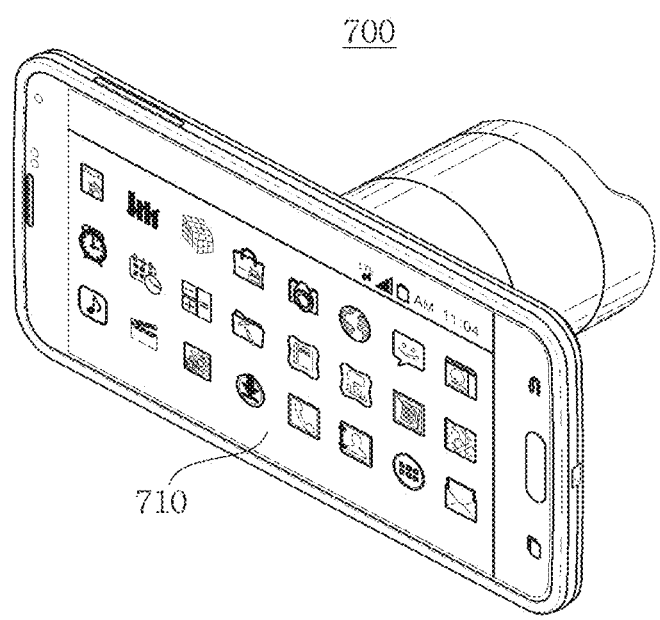
FIG. 12 illustrates a digital camera device 700 including the TSC shown in FIG. 1.

FIG. 12 illustrates a digital camera device 700 including the TSC shown in FIG. 1.

Referring to FIG. 12, the digital camera device 700 operates with an Android™ operating system (OS). In at least one example embodiment of the inventive concepts, the digital camera device 700 may include a Galaxy Camera™ or Galaxy Camera2™.

The digital camera device 700 may include a touch panel 710 capable of receiving a touch input from a user, a TSC capable of controlling the touch panel 710, an image sensor capable of capturing an image or a moving image, and an AP capable of controlling the image sensor.

In at least one example embodiment of the inventive concepts, the digital camera device 700 may include the SoC 100 shown in FIG. 1.

Figure 13A:
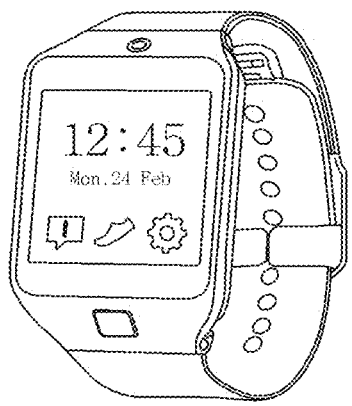
FIGS. 13A to 13C illustrate wearable devices including the TSC shown in FIG. 1.
Figure 13B:
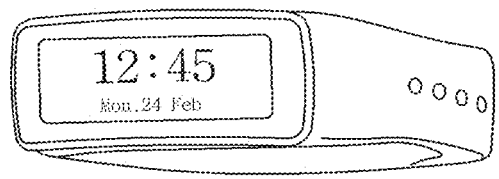
Figure 13C:
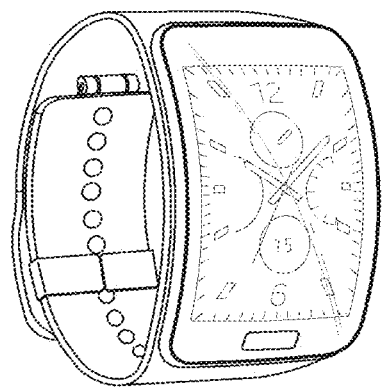

FIGS. 13A to 13C illustrate wearable devices including the TSC shown in FIG. 1.

Referring to FIGS. 13A and 13C, each of a first to third wearable devices 810 to 830 has a type of a wrist watch. Each of the first to third wearable devices 810 to 830 operates with an Android™ OS or TIZEN™ OS.

In at least one example embodiment of the inventive concepts, the first wearable device 810 may include a Galaxy Gear2™. The second wearable device 820 may include a Galaxy Gear Fit™. The third wearable device 830 may include a Galaxy Gear™.

Each of the first to third wearable devices 810 to 830 may include an AP which operates with an Android™ OS or TIZEN™ OS, an image sensor which captures an image or a moving image and a display device which displays the photographed image or a moving image.

In at least one example embodiment of the inventive concepts, each of the first to third wearable devices 810 to 830 may include the SoC 100 shown in FIG. 1.

The SoC according to at least one example embodiment of the inventive concepts may receive a clock only when the clock is desired. Accordingly, the SoC according at least one example embodiment of the inventive concepts may reduce power consumption.

While the inventive concepts have been described with reference to example embodiments, it will be understood by those skilled in the art that various changes and modifications may be made without departing from the spirit and scope of the inventive concepts as defined by the appended claims.

The inventive concepts may be applied to an SoC and a mobile device having the same.

Although a few example embodiments have been described, those skilled in the art will readily appreciate that many modifications are possible in example embodiments without materially departing from the novel teachings and advantages. Accordingly, all such modifications are intended to be included within the scope of these inventive concepts as defined in the claims.

What is claimed is:

1. A system-on-chip (SoC) comprising:
 a clock management unit (CMU) including a first clock generator configured to generate a first clock signal and a second clock generator configured to generate a second clock signal; and
 a logic block configured to communicate with the CMU through a first interface, and transmit a first signal to the CMU,
 wherein the second clock generator is configured to transmit the second clock signal to the first clock generator,
 the first clock generator is configured to generate the first clock signal using the second clock signal, and
 the CMU is configured to transmit a second signal and one of the first and second clock signals to the logic block in response to the first signal.

2. The SoC of claim 1, wherein the first interface is one of a Q-channel low-power interface and a P-channel low-power interface.

3. The SoC of claim 1, wherein the CMU further comprises:
 a manager configured to, through the first interface, receive the first signal from the logic block and transmit the second signal to the logic block in response to the first signal.

4. The SoC of claim 3, wherein the first clock generator includes,
 a first clock source configured to generate the first clock signal using the second clock signal, and
 a first full-handshake circuit configured to communicate with the manager through a second interface, and
 the second clock generator includes,
 a second clock source configured to generate the second clock signal, and
 a second full-handshake circuit configured to communicate with the first full-handshake circuit through a third interface.

5. The SoC of claim 4, wherein each of the first interface, the second interface, and the third interface is one of a Q-channel low-power interface and a P-channel low-power interface.

6. The SoC of claim 4, wherein the manager is further configured to transmit a third signal to the first full-handshake circuit through the second interface, in response to the first signal,
 in response to the third signal, the first full-handshake circuit is further configured to transmit a fourth signal to the manager through the second interface, and transmit a fifth signal to the second full-handshake circuit through the third interface, and
 in response to the fourth signal, the second full-handshake circuit is further configured to transmit a sixth signal to the first full-handshake circuit through the third interface.

7. The SoC of claim 6, wherein the manager comprises at least one first combination circuit configured to transmit the third signal or the second signal,
 the first full-handshake circuit comprises at least one second combination circuit configured to transmit the fifth signal or the fourth signal.

8. The SoC of claim 6, wherein when the logic block deactivates the first signal, the CMU performs a clock-off sequence.

9. The SoC of claim 8, wherein, when the first signal is deactivated, the manager deactivates the third signal and the first full-handshake circuit deactivates the fifth signal.

10. The SoC of claim 9, wherein when the third signal is deactivated, the first clock generator deactivates the first clock signal, and when the fifth signal is deactivated, the second clock generator deactivates the second clock signal.

11. The SoC of claim 9, wherein when the logic block activates the first signal during the clock-off sequence, the manager transmits a first command signal for blocking the clock-off sequence to the first full-handshake circuit, and the first full-handshake circuit transmits a second command signal for blocking the clock off sequence to the second full-handshake circuit in response to the first command signal.

12. The SoC of claim 1, wherein the CMU further comprises:
 a multiplexer circuit configured to receive the first clock signal from the first clock generator and the second clock signal from the second clock generator, and output one of the first and second clock signals in response to a selection signal.

13. A system-on-chip (SoC) comprising:
a logic block configured to output a first signal; and
a clock management unit (CMU) configured to communicate with the logic block through a first full-handshake interface, output one of a plurality of clock signals, and output a second signal through the first full-handshake interface in response to the first signal,
wherein the CMU includes,
a manager configured to receive the first signal and output a third signal, and
a plurality of clock generators configured to generate the plurality of clock signals,
wherein the manager and the plurality of clock generators communicate with each other through a plurality of full-handshake interfaces.

14. The SoC of claim 13, wherein the plurality of full-handshake interfaces comprises second to sixth full-handshake interfaces, and
the plurality of clock generators comprises:
a gate circuit configured to, through the second full-handshake interface, receive the third signal from the manager and transmit a fourth signal to the manager in response to the third signal;
a divider circuit configured to, through the third full-handshake interface, receive a fifth signal from the gate circuit and transmit a sixth signal to the gate circuit in response to the fifth signal;
a multiplexer circuit configured to, through the fourth full-handshake interface, receive a seventh signal from the divider circuit and transmit an eighth signal to the divider circuit in response to the seventh signal;
a phase locked loop (PLL) circuit configured to, through the fifth full-handshake interface, receive a ninth signal from the multiplexer circuit and transmit a tenth signal to the multiplexer circuit in response to the ninth signal; and
an oscillator pad configured to, through the sixth full-handshake interface, receive a eleventh signal from the PLL circuit and transmit a twelfth signal to the PLL circuit in response to the eleventh signal.

15. The SoC of claim 14, wherein each of the first to sixth full-handshake interfaces is one of a Q-channel low-power interface and a P-channel low-power interface.

16. The SoC of claim 14, wherein the plurality of clock signals comprises first to fifth clock signals,
the oscillator pad is further configured to generate the first clock signal in response to the eleventh signal from the PLL circuit,
the PLL circuit is further configured to generate the second clock signal using the first clock signal in response to the ninth signal from the multiplexer circuit,
the multiplexer circuit is further configured to generate the third clock signal using the second clock signal in response to the seventh signal from the divider circuit,
the divider circuit is further configured to generate the fourth clock signal using the third clock signal in response to the fifth signal from the gate circuit, and
the gate circuit is further configured to generate the fifth clock signal using the fourth clock signal in response to the third signal from the manager.

17. The SoC of claim 14, wherein the plurality of clock signals comprises first to fourth clock signals, the oscillator pad is further configured to simultaneously transmit the first clock signal and the twelfth signal to the PLL circuit,
the PLL circuit is further configured to simultaneously transmit the second clock signal and the tenth signal to the multiplexer circuit,
the multiplexer circuit is further configured to simultaneously transmit the third clock signal and the eighth signal to the divider circuit, and
the divider circuit is further configured to simultaneously transmit the fourth clock signal and the sixth signal to the gate circuit.

18. The SoC of claim 14, wherein the plurality of clock signals comprises first to fifth clock signals,
when the logic block deactivates the first signal, the CMU performs a clock off sequence such that:
when the first signal is deactivated, the manager is further configured to deactivate the second signal and the third signal;
when the third signal is deactivated, the gate circuit is further configured to deactivate the fourth signal, the fifth signal, and the fifth clock signal;
when the fifth signal is deactivated, the divider circuit is further configured to deactivate the sixth signal, the seventh signal, and the fourth clock signal;
when the seventh signal is deactivated, the multiplexer circuit is further configured to deactivate the eighth signal, the ninth signal, and the third clock signal;
when the ninth signal is deactivated, the PLL circuit is further configured to deactivate the tenth signal, the eleventh signal, and the second clock signal; and
when the eleventh signal is deactivated, the oscillator pad is further configured to deactivate the twelfth signal and the first clock signal.

19. The SoC of claim 18, wherein when the logic block re-activates the deactivated first signal while the CMU performs the clock off sequence such that:
the manager transmits a first command for blocking the clock off sequence to the gate circuit;
in response to the first command, the gate circuit re-activates the fifth clock signal and transmit a second command for blocking the clock off sequence to the divider circuit;
in response to the second command, the divider circuit re-activates the fourth clock signal and transmit a third command for blocking the clock off sequence to the multiplexer circuit;
in response to the third command, the multiplexer circuit re-activates the third clock signal and transmit a fourth command for blocking the clock off sequence;
in response to the fourth command, the PLL circuit re-activates the second clock signal and transmit a fifth command for blocking the clock off sequence; and
in response to the fifth command, the oscillator pad re-activates the first clock signal.

20. A system-on-chip (SoC) comprising:
a plurality of logic blocks; and
a clock management unit (CMU) including a first clock generator configured to generate a first clock signal, and a second clock generator configured to generate a second clock signal,
wherein the CMU is configured to,
receive a first signal from a first logic block of the plurality of logic blocks, and transmit the first clock signal and a second signal to the first logic block in response to the first signal, receive a third signal from a second logic block of the plurality of logic blocks, and transmit the second clock signal and a fourth signal to the second logic block in response to the third signal, and receive a fifth signal from a third logic block of the plurality of logic blocks, and transmit (i) one of the first and second clock signals and (ii) a sixth signal to the third logic block in response to the fifth signal, wherein the CMU communicates with each of the plurality of logic blocks based on one of a Q-channel interface and a P-channel interface.

\* \* \* \* \*